UNITED STATES PATENT OFFICE.

ABRAHAM HENWOOD, OF CYNWYD, PENNSYLVANIA.

MANUFACTURE OF PHOSPHATE FERTILIZERS.

1,310,080. Specification of Letters Patent. Patented July 15, 1919.

No Drawing. Application filed December 11, 1917. Serial No. 206,595.

*To all whom it may concern:*

Be it known that I, ABRAHAM HENWOOD, a citizen of the United States, residing at 306 Kent road, Cynwyd, in the county of Montgomery and State of Pennsylvania, have invented a certain new and useful Manufacture of Phosphate Fertilizers, of which the following is a specification.

My invention relates to fertilizers manufactured from phosphate rock and is directed to improvement in the manufacture (independently of the presence of fluorids in the phosphate rock), to improvement of the product, and to rendering available an inferior quality of phosphate rock which is not now available because of the presence of fluorids.

The purpose of my invention is to restrict the water used in bisulfate manufacture of phosphate fertilizers substantially to that required to hydrate the calcium sulfate.

A further purpose is to free the manufactured fertilizer from the injurious soluble hydrofluoric acid, a specific plant poison previously present in all fertilizers made from phosphate rock containing fluorids.

A further purpose is to add potash to a phosphate fertilizer as an incident to the manufacture of the fertilizer as distinguished from subsequent or separate addition of the potash.

A further purpose is to release or render soluble or available for use on the land the potash from insoluble potash aluminum silicates of whatever form.

A further purpose is to mix the ingredients to advantage, moistening them to a limited extent as they are fed, preferably as they are dropped in finely divided scattered form, and subsequently ripening the mixture.

Further purposes will appear in the specification and in the claims.

I have preferred to illustrate my invention by the description of but one main form thereof, recognizing that many variations in it may be made by those skilled in the art in view of the disclosure herein. The form described has been selected because of its commercial desirability.

My invention relates both to the process and to the product secured thereby.

Two main methods of manufacture of manures or fertilizers from phosphate rock (tertiary calcium phosphate, $Ca_3(PO_4)_2$) are known. The first is the well known and generally used sulfuric acid method of treatment used in Florida and other States nearby; the second is the but slightly known bisulfate method of manufacture using niter-cake ($NaHSO_4$), a by-product in the manufacture of nitric acid. This second method, so far as known, has not been described elsewhere than in a book published abroad and in the translation thereof, "*The Manufacture of Chemical Manures*" by J. Fritch, published abroad by Greenwood and in the United States by Van Nostrum (1911). The description appears on page 169.

The extract is as follows:—

"*Bisulfate superphosphate.*

"It now remains to say a word about another product absolutely unpublished, *i. e.* the bisulfate superphosphate. Bisulfate, as is well known, is a by product of the manufacture of nitric acid and finds hardly any use, except in glass works, and in the manufacture of Glauber salt. But it is difficult to sell and it is got quit of at any price, for the local authorities forbid it being run into streams. Dr. Grueber tried to utilize it in the manufacture of superphosphate. By mixing 500 kg. bisulfate with 150 kg. Algerian phosphate he obtained superphosphate, but the product was very deliquescent, because it wanted the water of constitution necessary to the formation of sulfate of lime. Dr. Grueber remedied that by adding to the phosphate 60 kg. of water. He thus obtained a dry superphosphate with 7 to 8% soluble phosphoric acid; the addition of a small amount of Algerian phosphate enabled it to be passed through the centrifugal crusher, to obtain it in a pulverulent form. As all manure factories require low superphosphates to adjust the analysis, this product would thus readily find a use."

In the process above, the difficulty experienced on account of the deliquescence could not have been cured by the addition of water; on the contrary the calcium sulfate necessarily present would tend to take up any absorbed water thereby keeping the mass dry, but causing the mass to set or cake after the manner of plaster of Paris. This would bind up or inclose soluble phosphates within the caked mass, impairing its availability. The addition of an excess amount of water would have tended to accentuate the trouble due to deliquescence.

If the phosphate had been pure, only about 52 kg. of water would have been required to supply the water of constitution and if, as is much more likely, the phosphate was about 80% pure only about 42 lbs. of the water would have been required. This is one of the reasons, at least, why it was necessary to mix dry phosphate rock with the product in order to get the requisite dryness to prepare the product for the crusher. The effects of this extra moisture in causing caking and subsequent addition of dry phosphate were sufficient reasons why it had to be reground.

I have discovered that these objections can be overcome by the limitation of the quantity of moisture to approximately that which is required to hydrate the calcium sulfate. As a result, my product is not deliquescent, has no tendency to set or cake and is never moist during manufacture. Moreover, the product is not only dry, but finely granular when it has ripened and requires no subsequent grinding. This is true whether I use the potassium aluminum silicate to overcome the injurious effect of my fluorids present (and also to supply soluble potassium) or whether I am merely manufacturing phosphate fertilizer by the bisulfate process from a rock which contains no fluorids or fluorids in but a negligible quantity.

The method of incorporating the several ingredients is also important in determining the physical character of the product and the degree of success attained in the decomposition of the phosphate rock. As best practised by me, I grind the solid materials to a fine state of division and mix them thoroughly. They may be ground together to advantage. I then sift the mixture into a storage bin and at the same time add finely divided water, preferably by spraying it into the mixture as the latter is being sifted into the bin, intending not to supply more water than sufficient to hydrate the calcium sulfate formed. The mass is then allowed to ripen until the amount of soluble phosphoric acid has reached the percentage determined upon or that can be reasonably expected from the mixture formed, preferably 8 or 9%. The product is dry and granular.

During the ripening the temperature rises very considerably, favoring uniform distribution of the moistures.

The second part of my invention is applicable equally to fertilizers manufactured by either the sulfuric acid process or by the bisulfate process.

At present no phosphate rock, neither phosphorite nor apatite, is available for the manufacture of fertilizer which is high in fluorids, because during the manufacture the fluorids are converted into hydrofluoric acid, which is soluble in water and which is a specific plant poison. For this reason the Canadian phosphate rock and other American phosphate rocks, though otherwise corresponding to the Florida phosphate rock, have not been available because of their greater percentage of fluorids; and practically the entire manufacture for North and South America has been confined to Florida and nearby States.

I overcome this objection and render the phosphates which contain fluorids in any quantity available for use, converting the objection into an advantage by the addition of a quantity of a potassium aluminum silicate, preferably orthoclase (potassium feldspar, $KAlSi_3O_8$) in a quantity proportionate to the content of fluorid. The hydrofluoric acid formed during the manufacture of the fertilizer attacks the feldspar, becoming converted into silicon fluorid ($SiF_4$), which gas interacts with water to form hydrofluosilicic acid, which is innocuous to plant life. At the same time, by decomposition of the feldspar, or other such silicate, potassium, a valuable plant food, contained therein, is chemically liberated throughout the fertilizer, being rendered soluble and available and at the same time automatically uniformly disseminated through the mass. The advantage of potassium has previously been recognized by the addition of separate soluble potassium salts to these manufactured fertilizers, subsequent to or during their manufacture. At the present time, the difficulty of obtaining potassium salts makes this prohibitive.

The potash is at present added in the form of a sulfate or chlorid of which the sulfate and chlorid radicals are useless as plant foods, whereas the potash which I disseminate throughout the mass is in the form of a phosphate whose acid radical, as well as the basic radical potassium is a plant food. The phosphate may be primary or secondary.

It will be recognized that the use of niter-cake in the bisulfate process is determined by the fact that niter-cake is produced during the manufacture of nitric acid, greatly in excess of the present needs for niter-cake and is at present a waste product and that others of the acid sulfates (for example, potassium, or ammonium acid sulfate) would be suitable if equally available, instead of the sodium acid sulfate known as niter-cake.

It will be recognized also that my invention which renders the fluorids innocuous and at the same time releases and distributes a desirable potassium product, will be applicable to both processes of treatment of the phosphate rock, notwithstanding that these two processes result in the formation of chemically different fertilizers; the sulfuric acid process producing primary calcium phosphate and calcium sulfate and the bisulfate process producing primary and secondary sodium phosphates and calcium sulfate.

It will be obvious also that my invention may have for its main purpose (what is described above as in the nature of a by-product) the opening up or rendering available soluble potash from insoluble silcates containing potash the needs and conditions of local use determining whether this availability of the potash shall be incidental to the elimination of the hydrofluoric acid, or the main purpose.

The reactions taking place in my bisulfate process and in my invention for eliminating the hydrofluoric acid, are as follows:

For the formation of the primary sodium phosphate:—

$$Ca_3(PO_4)_2 + 4NaHSO_4 + 6H_2O \rightarrow 3CaSO_4 \cdot 2H_2O + Na_2SO_4 + 2NaH_2PO_4$$

For the formation of the secondary sodium phosphate:—

$$Ca_3(PO_4)_2 + 3NaHSO_4 + 6H_2O \rightarrow Na_2HPO_4 + NaH_2PO_4 + 3CaSO_4 \cdot 2H_2O$$

Also, by reversion $$Ca_3(PO_4)_2 + 2NaH_2PO_4 \rightarrow 3CaHPO_4 + Na_2HPO_4$$

For the action of the niter-cake upon the fluorids:—

$$CaF_2 + 2NaHSO_4 + 2H_2O \rightarrow CaSO_4 \cdot 2H_2O + Na_2SO_4 + H_2F_2$$

For the action of the feldspar:—

$$2KAlSi_3O_8 + 2NaH_2PO_4 + 12H_2F_2 \rightarrow K_2HPO_4 + Na_2HPO_4 + 2Al(OH)_3 + 6SiF_4 + 10H_2O$$

$$6SiF_4 + 8H_2O \rightarrow 4H_2SiF_6 + 2Si(OH)_4$$

Having thus described my invention, what I claim as new and desire to secure by Letters Patent is:

1. The method of manufacture of phosphate fertilizer which consists in sifting ground phosphate rock and ground acid sulfate in the presence of a quantity of finely divided water limited to approximately sufficient to hydrate the calcium sulfate.

2. The method of manufacture of phosphate fertilizer which consists in feeding finely divided phosphate rock and finely divided acid sulfate through a quantity of finely divided water limited approximately to that required to hydrate the calcium sulfate and ripening the material so moistened.

3. The method of manufacture of phosphate fertilizer which consists in feeding mixed finely divided phosphate rock and acid sulfate through a spray of water in quantity limited to that required for hydration of the calcium sulfate.

4. The method of manufacture of phosphate fertilizer which consists in feeding mixed finely divided phosphate rock and acid sulfate through a spray of water in quantity limited to that required for hydration of the calcium sulfate and ripening the material so moistened.

5. The method of manufacture of fertilizer which consists in mixing finely divided phosphate rock and bisulfate and adding thereto a quantity of water approximating that necessary to hydrate the calcium sulfate formed.

6. The method of manufacture of fertilizer which consists in mixing finely divided phosphate rock and bisulfate and adding thereto a quantity of water approximating that necessary to hydrate the calcium sulfate formed, and ripening the same, resulting in a dry granular composition without necessity for addition of further phosphate rock.

7. The method of manufacture of fertilizer which consists in mixing finely divided phosphate rock and bisulfate, the mixture being non-deliquescent, to which a quantity of water is added, limited substantially to that necessary to hydrate the calcium sulfate formed.

8. The method of rendering available soluble potash from an insoluble potash aluminum silicate, which consists in treating the silicate with an acid sulfate in the presence of a fluorid.

9. The method of manufacture of phosphate fertilizer which consists in feeding finely divided phosphate rock containing fluorids, an acid sulfate and a silicious material with water, for the purpose of obtaining soluble phosphoric acid and changing the hydrofluoric acid formed from the fluorid in the phosphate rock into fluosilicates, which are innocuous to plant life.

10. The method of obtaining soluble potassium in the manufacture of phosphate fertilizer and at the same time rendering fluorids in the phosphate rock innocuous to plant life, which consists in mixing finely divided phosphate rock, niter-cake and potassium feldspar in the presence of a limited quantity of water to render the phosphoric acid and the potash soluble.

11. A phosphate fertilizer comprising finely divided phosphate rock and niter-cake adapted to form calcium sulfate, in combination with finely-divided feldspar and sufficient moisture to hydrate the calcium sulfate.

12. A phosphate fertilizer comprising finely divided dry phosphate rock and niter-cake adapted to form calcium sulfate in combination with finely-divided, dry potassium feldspar and sufficient moisture to hydrate the calcium sulfate.

ABRAHAM HENWOOD.